(12) United States Patent
Peng et al.

(10) Patent No.: US 12,285,150 B2
(45) Date of Patent: Apr. 29, 2025

(54) CLEANING ROBOT AND METHOD FOR TRAVELING ALONG EDGE, AND READABLE MEDIUM

(71) Applicant: ECOVACS ROBOTICS CO., LTD., Suzhou (CN)

(72) Inventors: Zhongmei Peng, Suzhou (CN); Qichao Li, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 767 days.

(21) Appl. No.: 17/049,314

(22) PCT Filed: Apr. 23, 2019

(86) PCT No.: PCT/CN2019/083878
§ 371 (c)(1),
(2) Date: Oct. 20, 2020

(87) PCT Pub. No.: WO2019/206133
PCT Pub. Date: Oct. 31, 2019

(65) Prior Publication Data
US 2021/0369069 A1  Dec. 2, 2021

(30) Foreign Application Priority Data
Apr. 25, 2018  (CN) .......................... 201810376562.4

(51) Int. Cl.
A47L 9/28  (2006.01)
A47L 7/02  (2006.01)
A47L 9/04  (2006.01)

(52) U.S. Cl.
CPC .............. *A47L 9/2826* (2013.01); *A47L 7/02* (2013.01); *A47L 9/0472* (2013.01);
(Continued)

(58) Field of Classification Search
CPC .... A47L 9/2826; A47L 9/2805; A47L 9/0466; A47L 9/0472; A47L 9/0477; A47L 11/14;
(Continued)

(56) References Cited

U.S. PATENT DOCUMENTS 9,456,725 B2  10/2016  Kim et al.
9,480,381 B2 *  11/2016  Schnittman ......... A47L 11/4066
(Continued)

FOREIGN PATENT DOCUMENTS

CN  102551591 A  7/2012
CN  203354472 U  12/2013
(Continued)

OTHER PUBLICATIONS

CN Office Action dated Mar. 6, 2024 as received in Application No. 201810376562.4.
(Continued)

*Primary Examiner* — Eric J Rosen
*Assistant Examiner* — Sharonda T Felton
(74) *Attorney, Agent, or Firm* — Maschoff Brennan

(57) ABSTRACT

Provided are a cleaning robot and a method for traveling along an edge, and a readable medium. The cleaning robot includes a body, where a rolling brush and a side brush are provided at a bottom of the body, the rolling brush and the side brush are transversely arranged at a front end of the cleaning robot, and one end of the rolling brush and the side brush are respectively arranged close to edges of two sides of the body; the cleaning robot further includes a control module and a ground medium identification sensor for detecting a type of a work surface, where the ground medium identification sensor sends a detection signal to the control module, and the control module controls the cleaning robot to travel along an edge with one side edge of the body according to the detection signal.

13 Claims, 3 Drawing Sheets

(52) U.S. Cl.
CPC ........... *A47L 9/0477* (2013.01); *A47L 9/2852* (2013.01); *A47L 2201/04* (2013.01); *A47L 2201/06* (2013.01)

(58) Field of Classification Search
CPC ........ A47L 11/16; A47L 11/18; A47L 11/282; A47L 11/4061; A47L 2201/00; A47L 2201/04; A47L 2201/06; A47L 7/02; A47L 9/2852; A47L 9/0488; A47L 11/24; A47L 11/32; A47L 11/40; A47L 11/4011; A47L 11/4038; A47L 11/404; G05D 2201/0203; G05D 1/024; G05D 1/0274; G05D 1/0219; G05D 1/2462; G05D 1/2467; G05D 1/241–2427; G05D 1/628; G05D 1/644; G05D 1/6445; G05D 1/648–6485

See application file for complete search history.

(56) References Cited

U.S. PATENT DOCUMENTS

| | | | |
|---|---|---|---|
| 9,798,328 | B2 | 10/2017 | Vicenti |
| 9,993,129 | B2 | 6/2018 | Santini |
| 10,296,007 | B2 | 5/2019 | Vicenti |
| 10,365,659 | B2 * | 7/2019 | Park ..................... G05D 1/0285 |
| 10,433,697 | B2 | 10/2019 | Lindhé et al. |
| 10,568,483 | B2 | 2/2020 | Lewis |
| 2012/0125363 | A1 | 5/2012 | Kim et al. |
| 2014/0075689 | A1 * | 3/2014 | Windorfer ............... A47L 11/24 15/21.1 |
| 2016/0103451 | A1 * | 4/2016 | Vicenti ............... A47L 11/4066 700/259 |
| 2016/0166127 | A1 | 6/2016 | Lewis |
| 2016/0235270 | A1 | 8/2016 | Santini |
| 2018/0088585 | A1 | 3/2018 | Vicenti |
| 2018/0289231 | A1 | 10/2018 | Santini |
| 2018/0338655 | A1 * | 11/2018 | Schregardus ......... A47L 9/0477 |

FOREIGN PATENT DOCUMENTS

| | | |
|---|---|---|
| CN | 103491841 A | 1/2014 |
| CN | 204133373 U | 2/2015 |
| CN | 204600365 U | 9/2015 |
| CN | 205083396 U | 3/2016 |
| CN | 105496314 A | 4/2016 |
| CN | 105744872 A | 7/2016 |
| CN | 105892457 A | 8/2016 |
| CN | 206560410 U | 10/2017 |
| CN | 208957993 U | 6/2019 |
| DE | 10 2014 100 162 A1 | 7/2015 |
| EP | 2 702 918 A1 | 3/2014 |
| JP | 2017153787 A | 9/2017 |
| JP | 2018047051 A | 3/2018 |

OTHER PUBLICATIONS

CN Notice of Acceptance of Request for Invalidation dated Nov. 30, 2023 as received in Application No. 201820596373.3.

CN Office Action dated Sep. 30, 2024 as received in Application No. 201810376562.4.

* cited by examiner

CLEANING ROBOT AND METHOD FOR TRAVELING ALONG EDGE, AND READABLE MEDIUM

FIELD

The present disclosure relates to a cleaning robot and a method for traveling along an edge, and a readable medium, which belongs to the technical field of small household appliance manufacturing.

BACKGROUND

The sweeping robot on the market is generally circular, and its main cleaning apparatus is a rolling brush arranged in the middle of the body. Side brushes provided on two sides of the body are used for sweeping dust into a rolling brush opening, but the side brushes can only sweep dust on a hard floor and cannot clean dust in a carpet. Thus, in a room decorated with a carpet, the above-described sweeping robot is always unable to clean dirt at the edge of a wall or other objects.

SUMMARY

Aiming at the defects of the prior art, the present disclosure provides a cleaning robot and a method for traveling along an edge, and a readable medium. By making use of a rolling brush and a side brush transversely arranged at a front end of the bottom of a body in combination with a ground medium identification sensor, the cleaning robot may clean dirt at the joint of a hard surface such as a floor with a wall by using the side brush, and clean dirt at the joint of a soft surface such as a carpet and a wall by using the rolling brush. Compared with the conventional cleaning robot, the cleaning robot provided by the present disclosure may have strong cleaning capacity, good cleaning effects and wide application range.

The technical solution to the technical problems to be solved by the present disclosure is as follows.

The present disclosure provides a cleaning robot, including a body, where a rolling brush and a side brush are provided at a bottom of the body, the rolling brush and the side brush are transversely arranged at a front end of the cleaning robot, and one end of the rolling brush and the side brush are respectively arranged close to edges of two sides of the body; the cleaning robot further including a control module and a ground medium identification sensor for detecting a type of a work surface, wherein the ground medium identification sensor sends a detection signal to the control module, and the control module controls the cleaning robot to travel along an edge with one side edge of the body according to the detection signal.

In order to make the area which cannot be swept by the side of the cleaning robot when the cleaning robot approaches an obstacle such as a wall smaller, a side edge, close to the rolling brush, of the body is the rolling brush side edge, and a distance between the rolling brush and the rolling brush side edge is less than or equal to 20 mm. A side edge, close to the side brush, of the body is the side brush side edge, and the distance between the center of the side brush and the side brush side edge is greater than the distance between the rolling brush and the rolling brush side edge. The side brush has bristles, and the distance between the center of the side brush and the side brush side edge is less than the distance between the center of the side brush and the ends of the bristles.

Further, the center of the side brush is positioned in front of the center of the rolling brush. Alternatively, the side brush and rolling brush are arranged transversely side by side.

In order to optimize the structure and cleaning range of the cleaning robot, the forward portion of the body is square.

In order to control the cleaning robot to travel along an edge along an obstacle such as a wall and the like by the control module, the body is provided with an edge sensor, the edge sensor includes infrared sensors arranged on the left side and the right side of the body, and the infrared sensor includes a transmitting end and a receiving end.

Preferably, the ground medium identification sensor is positioned in front of the rolling brush. The body is provided with two downward-looking sensors positioned in front of the rolling brush, and the ground medium identification sensor is positioned between the two downward-looking sensors.

The present disclosure also provides a method for traveling along an edge for a cleaning robot, including the following steps:

when the ground medium identification sensor detects that the work surface is a first surface, the cleaning robot is controlled to travel along an edge with a side edge close to the rolling brush; and when the ground medium identification sensor detects that the work surface is a second surface, the cleaning robot is controlled to travel along an edge with a side edge close to the side brush.

Preferably, the first surface is a carpet and the second surface is a floor.

The present disclosure also provides a readable medium, where the readable medium is provided in the cleaning robot, and a traveling control program for controlling the cleaning robot to travel according to the method for traveling along an edge as described above is stored in the readable medium.

In summary, the present disclosure makes use of the rolling brush and the side brush transversely arranged at the front end of the bottom of the body in combination with the ground medium identification sensor, so that the cleaning robot may clean dirt at the joint of a hard surface such as a floor with a wall by using the side brush, and may clean dirt at the joint of a soft surface such as a carpet and a wall by using the rolling brush. Compared with the conventional cleaning robot, the cleaning robot provided by the present disclosure may have strong cleaning capacity, good cleaning effects and wide application range.

BRIEF DESCRIPTION OF THE DRAWINGS

The drawings described herein are used to provide a further understanding of the present application and constitute a part of the present application. The example embodiments of the present application and the descriptions thereof are used to explain the present application, and do not constitute an improper limitation on the present application. In the drawings.

DETAILED DESCRIPTION OF EXAMPLE EMBODIMENTS

For making the purposes, technical solutions and advantages of the embodiments of the present invention clearer, the technical solutions in the embodiments of the present invention will be clearly and completely described below in combination with the drawings in the embodiments of the present invention. It is apparent that the described embodiments are not all embodiments but part of embodiments of the present invention. All other embodiments obtained by those of ordinary skill in the art on the basis of the embodiments in the present invention without creative work shall fall within the scope of protection of the present invention.

Figure 1:
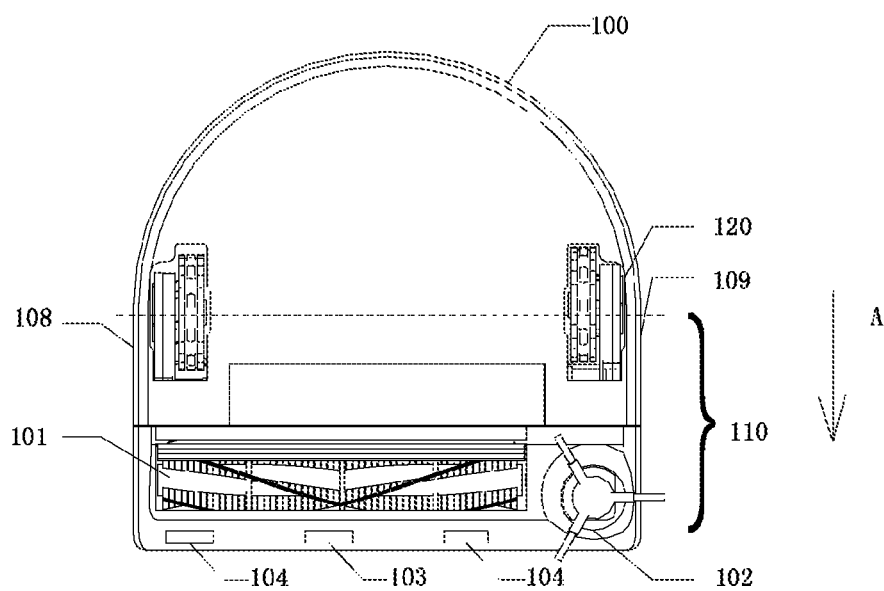
FIG. 1 is a schematic view of a bottom of a cleaning robot of the present disclosure.
Figure 2:
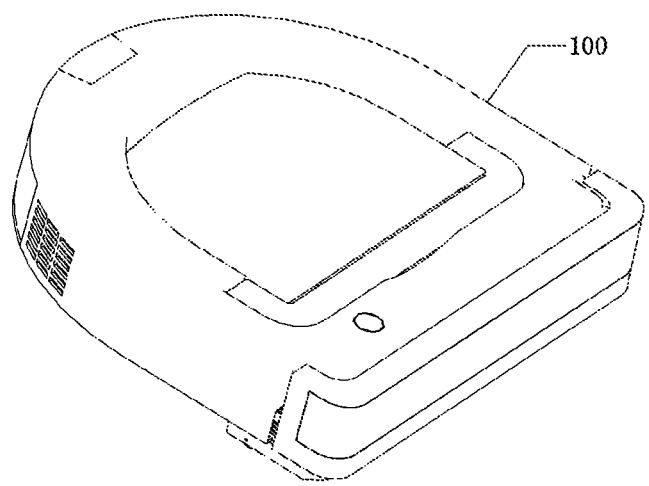
FIG. 2 is a schematic view of a structure of a cleaning robot of the present disclosure.

FIG. 1 is a schematic view of a bottom of a cleaning robot of the present disclosure; and FIG. 2 is a schematic view of a structure of a cleaning robot of the present disclosure. As shown in FIG. 1 combined with FIG. 2, the present disclosure provides a cleaning robot, including a body 100. The body 100 is provided with a control module, a sensing module, a cleaning module, a traveling module and the like. The sensing module is used for detecting the state and surrounding environment of the cleaning robot and transmitting a detection signal to the control module so as to instruct the cleaning robot to work, the cleaning module is used for cleaning a work surface, the traveling module is used for driving the cleaning robot to travel, and the control module transmits a control signal to the cleaning module and the traveling module so as to enable the cleaning robot to perform cleaning work.

Taking the traveling direction A of the cleaning robot as the front, the cleaning module includes one rolling brush 101 and one side brush 102, which are arranged at the bottom of the body 100. The rolling brush 101 and the side brush 102 are transversely arranged at the front end of the cleaning robot, namely being arranged leftward and rightward in the direction perpendicular to the direction A. The rolling brush 101 may be arranged on the left side or the right side of the cleaning robot.

In order to make the area which cannot be swept by the front end of the cleaning robot when the cleaning robot encounters an obstacle such as a wall smaller, the rolling brush 101 and the side brush 102 are arranged as close to the front end of the cleaning robot as possible, and similarly, in order to make the area which cannot be swept by the side of the cleaning robot when the cleaning robot approaches an obstacle such as a wall smaller, the one end of the rolling brush 101 and the side brush 102 are respectively arranged close to the edges of two sides of the body.

Preferably, the side edge, close to the rolling brush 101, of the body 100 is defined as a rolling brush side edge 108, and the distance between the rolling brush 101 and the side edge close to it is less than or equal to 20 mm, namely the distance between the rolling brush 101 and the rolling brush side edge 108 is less than or equal to 20 mm. The side edge, close to the side brush 102, of the body 100 is defined as a side brush side edge 109, and the distance between the center of the side brush 102 and the side brush side edge 109 is greater than the distance between the rolling brush 101 and the rolling brush side edge 108. The distance between the rolling brush 101 and the front boundary of the body 100 is less than or equal to 10 mm. the side brush 102 has bristles, and the distance between the center of the side brush 102 and the side brush side edge 109 is less than the distance between the center of the side brush and the ends of the bristles, namely the outer ends of the bristles of the side brush 102 exceed the boundary of the body 100, to facilitate the cleaning of dirt by bristles between the cleaning robot and the wall. Further, the center of the side brush 102 may be positioned in front of the center of the rolling brush 101, namely, the distance between the center of the side brush 102 and the front boundary of the body 100 is less than the distance between the center of the rolling brush 101 and the front boundary of the body 100; alternatively, the distance between the center of the side brush 102 and the front boundary of the body 100 is equal to the distance between the center of the rolling brush 101 and the front boundary of the body 100, that is, the side brush 102 and the rolling brush 101 are arranged transversely side by side.

It is added that, in order to optimize the structure and cleaning range of the cleaning robot, the forward portion 110 of the body 100 is square or substantially square in the present disclosure, and the square forward portion 110 facilitates the transversal arrangement of the rolling brush 101 and the side brush 102, while increasing the effective cleaning surface of the cleaning robot.

The cleaning module further includes a vacuum unit for generating a suction force by means of which the cleaning robot in the present disclosure sucks dust from the work surface with the aid of the side brush 102 and the rolling brush 101 into a collecting apparatus on the body 100.

The traveling module includes a driving motor, a driving wheel 120 driven by the driving motor and the like, and is used for driving the cleaning robot to travel.

The sensing module is used for detecting the state and the working environment of the cleaning robot. The sensing module includes a ground medium identification sensor 103, a collision sensor, a downward-looking sensor 104, an edge sensor, an environment sensor and the like, wherein the environment sensor may detect the terrain of an area around the work spot of the cleaning robot and/or determine the position of the cleaning robot so as to draw a work map, and sends a detection signal of the environment sensor to the control module to aid the cleaning robot in planning a route or a work mode so as to further improve the work efficiency. The collision sensor is arranged in front of the cleaning robot, and may timely detect and send detection signals to the control module when the cleaning robot encounters an obstacle such as a wall. The downward-looking sensor 104 is provided on the front side of the bottom of the body 100, preferably in front of the rolling brush 101, for detecting the presence of a pit or a step edge in front of the cleaning robot and sending a detection signal to the control module to prevent the cleaning robot from falling. The edge sensor is used for detecting the distance between the side edge of the body 100 and an obstacle such as a wall and sending a detection signal to the control module, and the control module controls the cleaning robot to work according to the detection signal so as to make it convenient for the control module to control the cleaning robot to travel along an edge along an obstacle such as a wall, for example, infrared sensors may be arranged on the left side and the right side of the body 100, positioning relative to the wall is carried out through the interaction of the transmitting end and the receiving end, and next posture adjustment is determined.

The ground medium identification sensor 103 is provided in front of the rolling brush 101 for detecting the type of the work surface, which is capable of distinguishing whether a carpet is present on the ground and sending a detection signal to the control module. Preferably, the number of downward-looking sensor 104 is two, and the ground medium identification sensor 103 is positioned between the two downward-looking sensors 104. The ground medium identification sensor 103 sends a detection signal to the control module, and the control module controls the cleaning robot to edge-work with one side edge of the body 100 according to the detection signal.

The cleaning method of the cleaning robot in the present disclosure has two cleaning modes: a covering cleaning mode and an edge cleaning mode. For example, the cleaning robot in the present disclosure may first perform the covering cleaning mode and then perform the edge cleaning mode to clean the entire work surface. The cleaning robot in the covering cleaning mode may clean using the covering path techniques known in the art, e.g. bow-type traveling mode, spiral traveling mode, random traveling mode, etc. And after entering the edge cleaning mode, the cleaning robot travels along an obstacle such as a wall, so that dirt on the edge of the wall is cleaned.

Figure 3:
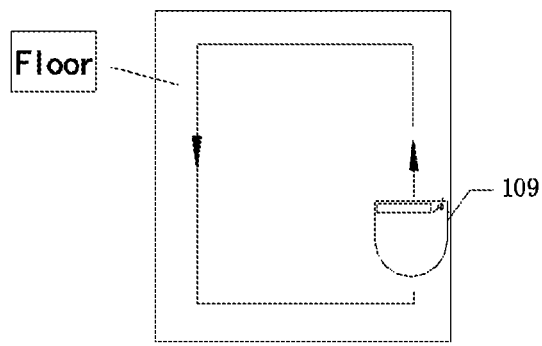
FIG. 3 is a schematic view of a cleaning robot of the present disclosure performing an edge cleaning mode on a floor.
Figure 4:
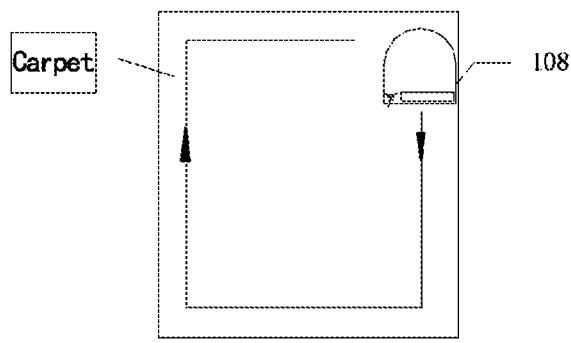
FIG. 4 is a schematic view of a cleaning robot of the present disclosure performing an edge cleaning mode on a carpet.

FIG. 3 is a schematic view of a cleaning robot of the present disclosure performing an edge cleaning mode on a floor; and FIG. 4 is a schematic view of a cleaning robot of the present disclosure performing an edge cleaning mode on a carpet. As shown in FIG. 3 combined with FIG. 4, the present disclosure further discloses a method for traveling along an edge for a cleaning robot, including the following steps: when a ground medium identification sensor detects that the work surface is a first surface, the cleaning robot is controlled to travel along an edge with the side edge close to the rolling brush 101 (i.e. the rolling brush side edge 108); when the ground medium identification sensor detects that the work surface is a second surface, the cleaning robot is controlled to travel along an edge with the side edge close to the side brush 102 (a side brush side edge 109). Preferably, the first surface is a soft surface such as a carpet, and the second surface is a hard surface such as a floor (wood floor, ceramic tile, PVC floor), a cement floor, etc.

Specifically, after the cleaning robot enters an edge cleaning mode, the ground medium identification sensor 103 sends a detection signal to the control module, and if it is detected that the work surface is the first surface (a soft surface such as a carpet), the control module controls a traveling module to turn, so that the cleaning robot may travel along an edge along an obstacle such as a wall with the rolling brush side edge 108; if it is detected that the work surface is the second surface (wood floor, ceramic tile, PVC floor), the control module controls the traveling module to turn, so that the cleaning robot may travel along an edge along an obstacle such as a wall by the side brush side edge 109 (the arrow in the figure is the traveling direction of the cleaning robot).

It is to be added that those skilled in the art could replace a rolling brush or a side brush with other types of cleaning assemblies, such as a scraping strip, etc. according to actual requirements. Furthermore, the ground medium identification sensor 103 may be used in cooperation with various types of cleaning assemblies. After the type of the ground medium is identified by the ground medium identification sensor, the control module controls the cleaning robot to travel along an edge with a side edge close to the proper cleaning assembly, so as to improve the cleaning effect of the cleaning robot and enhance the adaptability thereof.

With the ground medium identification sensor 103 installed to detect floors and carpets, when the work surface is a mixed surface (a variety of work surfaces such as carpets and floors are present), the cleaning robot will select a proper path of travel to keep correct edge cleaning.

Figure 5:
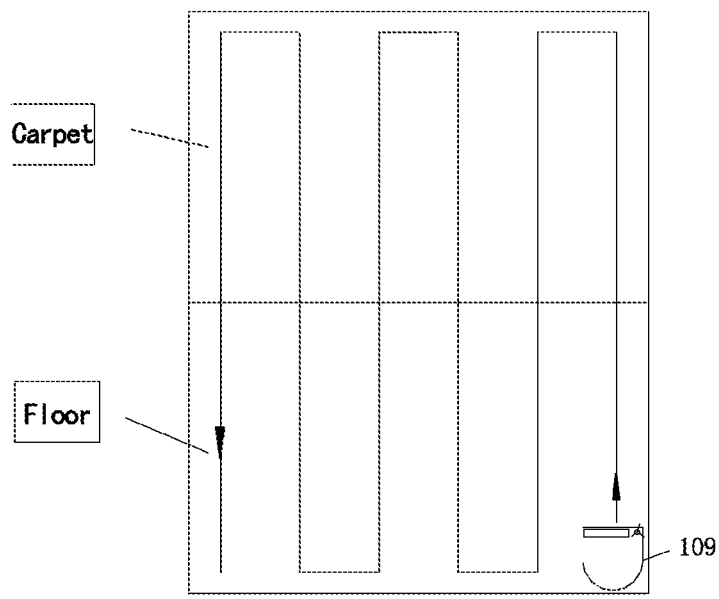
FIG. 5 is a schematic view of a cleaning robot of the present disclosure performing an covering cleaning mode on a mixed surface.
Figure 6:
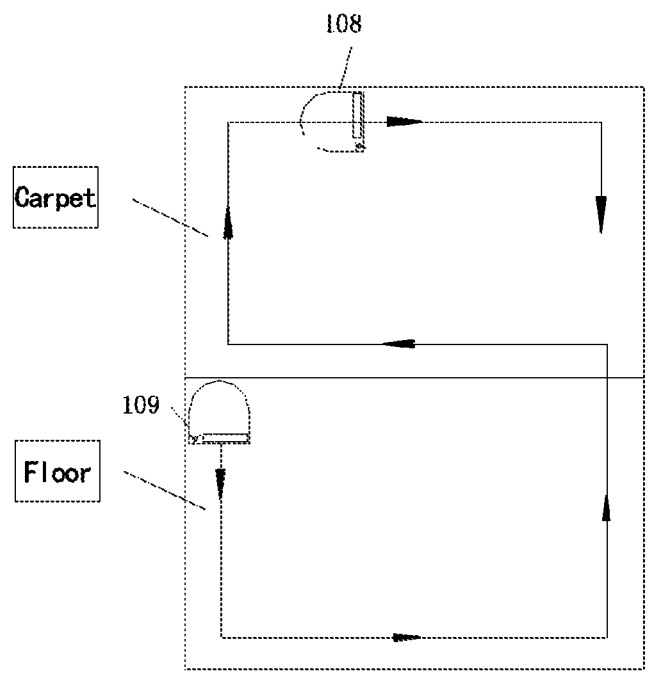
FIG. 6 is a schematic view of a cleaning robot of the present disclosure performing an edge cleaning mode on a mixed surface.

FIG. 5 is a schematic view of a cleaning robot of the present disclosure performing a covering cleaning mode on a mixed surface; and FIG. 6 is a schematic view of a cleaning robot of the present disclosure performing an edge cleaning mode on a mixed surface. As shown in FIG. 5 and FIG. 6, when the cleaning robot is operated on the mixed surface, in order to achieve full cleaning, the covering cleaning mode, which is a left-right staggered form in the present embodiment, is first performed; when the cleaning robot finishes the covering cleaning mode, the cleaning robot enters the edge cleaning mode. Specifically, after entering the edge cleaning mode, the ground medium identification sensor 103 on the cleaning robot sends a detection signal to a control module, and the control module controls the traveling module to turn according to the detection signal, so that the cleaning robot may travel along an edge along an obstacle such as a wall with a proper side edge, and when traveling to the junction of the carpet and the floor, the cleaning robot may continue traveling along the junction line of the carpet and the floor until encountering an obstacle such as a wall, and at the same time, the control module controls the traveling module to turn, so that the cleaning robot may travel along an edge with another side edge, thereby completing full cleaning. It is to be added that the present disclosure does not limit the specific method for the cleaning robot to travel along an edge with another side edge after it travels to the joint line of the carpet and the floor, and those skilled in the art would be able to design the specific method according to actual requirements, for example, when the cleaning robot travels to the joint line of the carpet and the floor, the following method may also be adopted: an environmental sensor (e.g. a laser sensor) measures a shortest path to the opposite wall and the cleaning robot moves along the path to the opposite wall, after which the cleaning robot continues cleaning in the original direction along the wall.

Further, since the cleaning robot in the present disclosure is provided with an environmental sensor capable of detecting the terrain of the area around the work spot of the cleaning robot and/or determining the position of the cleaning robot, and capable of drawing a work map, on the basis that the ground medium type is identified by the ground medium identification sensor 103, the distribution of the ground medium on the work surface may be recorded on the corresponding work map, and the control module may help the cleaning robot to plan a route or a work mode according to the work map, for example, after generating the work map with the ground medium information, when the cleaning robot works, the ground medium identification sensor 103 thereof does not work or works periodically (for example, works once per week to periodically correct the stored work gradient according to the change of the work environment), so that the work efficiency is further improved.

In some embodiments, the cleaning robot of the present disclosure may further be provided with a man-machine interaction module and a wireless communication module which are coupled with the control module in a matching mode, the man-machine interaction module may be a screen, a mobile phone, a remote controller and the like which are arranged on the cleaning robot, a user can know the cleaning condition and self-information of the cleaning robot by using the man-machine interaction module through the wireless communication module and plan a cleaning path of the cleaning robot, and the like. In addition, a user can record relevant information through the man-machine interaction module and send the information to other types of robots (such as an air purifying robot and the like) so as to instruct other robots to work in the same work area.

It is to be added that the present disclosure does not limit the working method of the cleaning robot, i.e. the cleaning robot does not only work according to the above-described sequence of the covering cleaning mode and the edge cleaning mode. For example, when the cleaning robot enters a work area with more water stains such as a kitchen and bathroom, even if the work surface of the kitchen and bathroom is a second surface (wood floor, ceramic tile, PVC floor), since the side brush cannot completely clean the water stains, the cleaning robot may travel along an edge with the side edge close to the rolling brush 101 (i.e. the rolling brush side edge 108) to achieve a better cleaning effect. The identification of a special work area such as a kitchen and a bathroom may be manually specified by a user and may also be automatically identified by an environment sensor. In other words, the present disclosure aims to provide a cleaning robot which may change a cleaning manner according to the type of a ground medium, the above-described method for traveling along an edge can be combined with the cleaning traveling method in the prior art, and can be modified according to actual requirements, and the present disclosure is not limited thereto.

The present disclosure further provides a readable medium. The readable medium is provided inside the cleaning robot. A traveling control program is stored in the readable medium for controlling the cleaning robot to travel according to the above-described method for traveling along an edge, the control unit may read the traveling control program from the readable medium, thereby controlling the cleaning robot to travel along an edge. The readable medium is an existing computer readable storage.

The present disclosure makes use of the rolling brush and the side brush transversely arranged at the front end of the bottom of the body in combination with the ground medium identification sensor, so that the cleaning robot may clean dirt at the joint of a hard surface such as a floor with a wall by using the side brush, and may clean dirt at the joint of a soft surface such as a carpet and a wall by using the rolling brush. Compared with the conventional cleaning robot, the cleaning robot provided by the present disclosure may have strong cleaning capacity, good cleaning effects and wide application range.

Those skilled in the art should know that the embodiment of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

The present disclosure is described with reference to flowcharts and/or block diagrams of the method, a device (system) and computer program product according to the embodiment of the present disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction apparatus may be generated by the instructions stored in the computer-readable memory, the instruction apparatus realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may implement information storage by any method or technology. The information may be a computer-readable instruction, a data structure, a program module, or other data. Examples of computer storage media include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by a computing device. As defined herein, the computer-readable medium does not include non-transitory computer-readable media such as modulated data signals and carrier waves.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Those skilled in the art should know that the embodiment of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A cleaning robot, comprising a body, wherein one rolling brush and one side brush are provided at a bottom of the body, the rolling brush and the side brush are transversely arranged at a front end of the cleaning robot, and one end of the rolling brush and the side brush are respectively arranged close to two side edges of the body; wherein one side edge of the two side edges of the body close to the rolling brush is a rolling brush side edge, and another side edge of the two side edges of the body close to the side brush is a side brush side edge;

the cleaning robot further comprising a control module and a ground medium identification sensor for detecting a type of a work surface, wherein the ground medium identification sensor sends a detection signal to the control module, and the control module selects the rolling brush side edge or the side brush side edge according to the detection signal and controls the cleaning robot to travel along the selected side edge.

2. The cleaning robot of claim 1, wherein a distance between the rolling brush and the rolling brush side edge is less than or equal to 20 mm.

3. The cleaning robot of claim 2, wherein a distance between a center of the side brush and the side brush side edge is greater than the distance between the rolling brush and the rolling brush side edge.

4. The cleaning robot of claim 3, wherein the side brush has bristles, and the distance between the center of the side brush and the side brush side edge is less than a distance between the center of the side brush and ends of the bristles.

5. The cleaning robot of claim 1, wherein the center of the side brush is positioned in front of a center of the rolling brush.

6. The cleaning robot of claim 1, wherein the side brush and the rolling brush are arranged transversely side by side.

7. The cleaning robot of claim 1, wherein a forward portion of the body is square.

8. The cleaning robot of claim 1, wherein the body is provided with an edge sensor, the edge sensor comprises infrared sensors provided at left and right sides of the body, and the infrared sensors comprise a transmitting end and a receiving end.

9. The cleaning robot of claim 1, wherein the ground medium identification sensor is positioned in front of the rolling brush.

10. The cleaning robot of claim 9, wherein the body is provided with two downward-looking sensors in front of the rolling brush, and the ground medium identification sensor is positioned between the two downward-looking sensors.

11. A method for traveling along an edge for a cleaning robot, comprising:

controlling the cleaning robot to travel along an edge with a side edge close to a rolling brush, when a ground medium identification sensor detects that a work surface is a first surface; and controlling the cleaning robot to travel along the edge with a side edge close to a side brush, when the ground medium identification sensor detects that the work surface is a second surface.

12. The method for traveling along an edge of claim 11, wherein the first surface is a carpet and the second surface is a floor.

13. A cleaning robot, comprising a body, wherein a rolling brush and a side brush are provided at a bottom of the body, the rolling brush and the side brush are transversely arranged, and one end of the rolling brush and the side brush are respectively arranged close to edges of two sides of the body; wherein one side edge of the two side edges of the body close to the rolling brush is a rolling brush side edge, and another side edge of the two side edges of the body close to the side brush is a side brush side edge;

the cleaning robot further comprising a control module and a ground medium identification sensor for detecting a type of a work surface, wherein the ground medium identification sensor sends a detection signal to the control module, and the control module selects the rolling brush side edge or the side brush side edge according to the detection signal and controls the cleaning robot to travel along the selected side edge.

* * * * *